(12) United States Patent
Kadiri et al.

(10) Patent No.: US 11,399,406 B2
(45) Date of Patent: Jul. 26, 2022

(54) MAINTAINING A MULTICAST/BROADCAST RADIO BEARER IN AN IDLE STATE OR AN INACTIVE STATE

(71) Applicant: QUALCOMM Incorporated, San Diego, CA (US)

(72) Inventors: Prasad Reddy Kadiri, San Diego, CA (US); Sitaramanjaneyulu Kanamarlapudi, San Diego, CA (US); Gavin Bernard Horn, La Jolla, CA (US); Xipeng Zhu, San Diego, CA (US); Umesh Phuyal, San Diego, CA (US); Alberto Rico Alvarino, San Diego, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/073,924

(22) Filed: Oct. 19, 2020

(65) Prior Publication Data

US 2021/0127448 A1    Apr. 29, 2021

Related U.S. Application Data

(60) Provisional application No. 62/925,454, filed on Oct. 24, 2019.

(51) Int. Cl.
*H04W 76/25* (2018.01)
*H04W 4/06* (2009.01)
(Continued)

(52) U.S. Cl.
CPC ............ *H04W 76/25* (2018.02); *H04W 4/06* (2013.01); *H04W 52/0209* (2013.01); *H04L 12/189* (2013.01)

(58) Field of Classification Search
CPC ... H04W 76/25; H04W 4/06; H04W 52/0209; H04W 76/27; H04W 52/0219;
(Continued)

(56) References Cited

U.S. PATENT DOCUMENTS

| 2006/0221896 | A1* | 10/2006 | Vaittinen | ............. | H04W 72/005 |
| | | | | | 370/328 |
| 2010/0165905 | A1* | 7/2010 | Kanazawa | .......... | H04W 72/005 |
| | | | | | 370/312 |

(Continued)

OTHER PUBLICATIONS

"Citation part 1 of 2*—""3rd Generation Partnership Project, Technical Specification Group Radio Access Network; General Packet Radio Service (GPRS), Mobile Station (MS)—Base Station System (BSS) interface, Radio Link Control / Medium Access Control (RLC/MAC) protocol (Release 15)" 3GPP Standard Technical Specification, 3GPP TS 44.060.

(Continued)

*Primary Examiner* — Afshawn M Towfighi
(74) *Attorney, Agent, or Firm* — Harrity & Harrity, LLP; Kevin M. Donnelly

(57) ABSTRACT

Various aspects of the present disclosure generally relate to wireless communication. In some aspects, a user equipment (UE) may receive a configuration for a multicast/broadcast radio bearer (MRB) in a radio link control (RLC) acknowledged mode; enter an idle state or an inactive state after the MRB has been configured; and maintain the MRB while the UE is in the idle state or the inactive state subject to one or more limitations associated with maintaining the MRB in the idle state or the inactive state. Numerous other aspects are provided.

30 Claims, 9 Drawing Sheets

(51) Int. Cl.
*H04W 52/02* (2009.01)
*H04L 12/18* (2006.01)

(58) Field of Classification Search
CPC .......................... H04W 52/0245; H04W 76/40; H04L 12/189; Y02D 30/70
See application file for complete search history.

(56) References Cited

U.S. PATENT DOCUMENTS

| | | | | |
|---|---|---|---|---|
| 2019/0281651 | A1* | 9/2019 | Lee | H04W 76/27 |
| 2021/0127448 | A1* | 4/2021 | Kadiri | H04W 4/06 |
| 2021/0360726 | A1* | 11/2021 | Li | H04W 74/0833 |

OTHER PUBLICATIONS

Citation part 2 of 2*—3rd Generation Partnership Project (3GPP), Mobile Competence Centre, 650, Route Des Lucioles, F-06921 Sophia-Antipolis Cedex, France, vol. RAN WG6. No. V15.0.0, Jun. 25, 2018 (Jun. 25, 2018), pp. 1-778, XP051474186. [retrieved on Jun. 25, 2018], Sections 7.7.2-7.7.2.2. 4.2.

'Citation part 1 of 2* - "3rd Generation Partnership Project, Technical Specification Group Radio Access Network, Introduction of the Multimedia Broadcast/Multicast Service (MBMS) in the Radio Access Network (RAN), Stage 2 (Release 15)", 3GPP Draft, 25346-F00, 3rd Generation Partnership Project (3GPP), Mobile Competence Centre, 650, Route Des Lucioles.

Citation part 2 of 2*—F-06921 Sophia-Antipolis Cedex, France, Jun. 29, 2018 (Jun. 29, 2018), XP051589510, 71 Pages, Retrieved from the Internet: URL: http://www.3gpp.org/ftp/tsg%5Fran/WG6%5FlegacyRAN/TSGR6%5F08/Implemented%20specs%20after%20TSG%20RAN%5F80/Upgraded%20specs%20from%20Rel%2D14%20to%20Rel%2D15/25346%2Df00%2Ezip. [retrieved on Jun. 29, 2018] Section 7.3.1. 7.3.2. 10.2.1.

International Search Report and Written Opinion—PCT/US2020/070676—ISA/EPO—dated Feb. 2, 2021.

* cited by examiner

MAINTAINING A MULTICAST/BROADCAST RADIO BEARER IN AN IDLE STATE OR AN INACTIVE STATE

CROSS-REFERENCE TO RELATED APPLICATION

This Patent Application claims priority to U.S. Provisional Patent Application No. 62/925,454, filed on Oct. 24, 2019, entitled "MAINTAINING A MULTICAST/BROADCAST RADIO BEARER IN AN IDLE STATE OR AN INACTIVE STATE," and assigned to the assignee hereof. The disclosure of the prior Application is considered part of and is incorporated by reference in this Patent Application.

FIELD OF THE DISCLOSURE

Aspects of the present disclosure generally relate to wireless communication and specifically, to techniques and apparatuses for maintaining a multicast/broadcast radio bearer in an idle state or an inactive state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

Support for multicast or broadcast (sometimes referred to herein as multicast/broadcast) services is being added to NR. In NR, a UE may be capable of receiving, for example, multicast/broadcast services in a mixed mode or a broadcast mode. Using mixed mode, multicast/broadcast services may be delivered using either a multicast/broadcast radio bearer (MRB) or a dedicated radio bearer (DRB) for a UE in a radio resource control (RRC) connected state. Using broadcast mode, multicast/broadcast services may be delivered using an MRB for a UE in an RRC connected state, an RRC idle state, or an RRC inactive state. However, the delivery of multicast/broadcast services in the RRC idle state or the RRC inactive state may increase UE power consumption for these states that were, on the contrary, designed to reduce UE power consumption.

SUMMARY

In some aspects, a method of wireless communication, performed by a user equipment (UE), may include receiving a configuration for a multicast/broadcast radio bearer (MRB) in a radio link control (RLC) acknowledged mode. The method may include entering an idle state or an inactive state after the MRB has been configured. The method may include maintaining the MRB while the UE is in the idle state or the inactive state subject to one or more limitations associated with maintaining the MRB in the idle state or the inactive state.

In some aspects, a UE for wireless communication may include memory and one or more processors operatively coupled to the memory. The memory and the one or more processors may be configured to receive a configuration for an MRB in an RLC acknowledged mode. The memory and the one or more processors may be configured to enter an idle state or an inactive state after the MRB has been configured. The memory and the one or more processors may be configured to maintain the MRB while the UE is in the idle state or the inactive state subject to one or more limitations associated with maintaining the MRB in the idle state or the inactive state.

In some aspects, a non-transitory computer-readable medium may store one or more instructions for wireless communication. The one or more instructions, when executed by one or more processors of a UE, may cause the UE to receive a configuration for an MRB in an RLC acknowledged mode. The one or more instructions may cause the UE to enter an idle state or an inactive state after the MRB has been configured. The one or more instructions may cause the UE to maintain the MRB while the UE is in the idle state or the inactive state subject to one or more limitations associated with maintaining the MRB in the idle state or the inactive state.

In some aspects, an apparatus for wireless communication may include means for receiving a configuration for an MRB in an RLC acknowledged mode. The apparatus may include means for entering an idle state or an inactive state after the MRB has been configured. The apparatus may include means for maintaining the MRB while the apparatus is in the idle state or the inactive state subject to one or more limitations associated with maintaining the MRB in the idle state or the inactive state.

In some aspects, a method of wireless communication performed by a UE includes receiving a configuration for an MRB in an RLC acknowledged mode. The method may include storing a context associated with the MRB in a memory of the UE based at least in part on the configuration. The method may include entering an idle state or an inactive state, after the MRB has been configured and the context has been stored, without removing the context from the memory. The method may include maintaining the MRB while the UE is in the idle state or the inactive state subject to one or more limitations associated with maintaining the MRB in the idle state or the inactive state based at least in part on entering the idle state or the inactive state without removing the context from the memory.

In some aspects, a UE for wireless communication includes a memory and one or more processors operatively coupled to the memory. The memory and the one or more processors may be configured to receive a configuration for an MRB in an RLC acknowledged mode. The memory and the one or more processors may be configured to store a context associated with the MRB in the memory based at least in part on the configuration. The memory and the one or more processors may be configured to enter an idle state or an inactive state, after the MRB has been configured and the context has been stored, without removing the context from the memory. The memory and the one or more processors may be configured to maintain the MRB while the UE is in the idle state or the inactive state subject to one or more limitations associated with maintaining the MRB in the idle state or the inactive state based at least in part on entering the idle state or the inactive state without removing the context from the memory.

In some aspects, a non-transitory computer-readable medium may store one or more instructions for wireless communication. The one or more instructions, when executed by one or more processors of a UE, may cause the UE to receive a configuration for an MRB in an RLC acknowledged mode. The one or more instructions may cause the UE to store a context associated with the MRB in the memory based at least in part on the configuration. The one or more instructions may cause the UE to enter an idle state or an inactive state, after the MRB has been configured and the context has been stored, without removing the context from the memory. The one or more instructions may cause the UE to maintain the MRB while the UE is in the idle state or the inactive state subject to one or more limitations associated with maintaining the MRB in the idle state or the inactive state based at least in part on entering the idle state or the inactive state without removing the context from the memory.

In some aspects, an apparatus for wireless communication may include means for receiving a configuration for an MRB in an RLC acknowledged mode. The apparatus may include means for storing a context associated with the MRB in a memory of the UE based at least in part on the configuration. The apparatus may include means for entering an idle state or an inactive state, after the MRB has been configured and the context has been stored, without removing the context from the memory. The apparatus may include means for maintaining the MRB while the UE is in the idle state or the inactive state subject to one or more limitations associated with maintaining the MRB in the idle state or the inactive state based at least in part on entering the idle state or the inactive state without removing the context from the memory.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
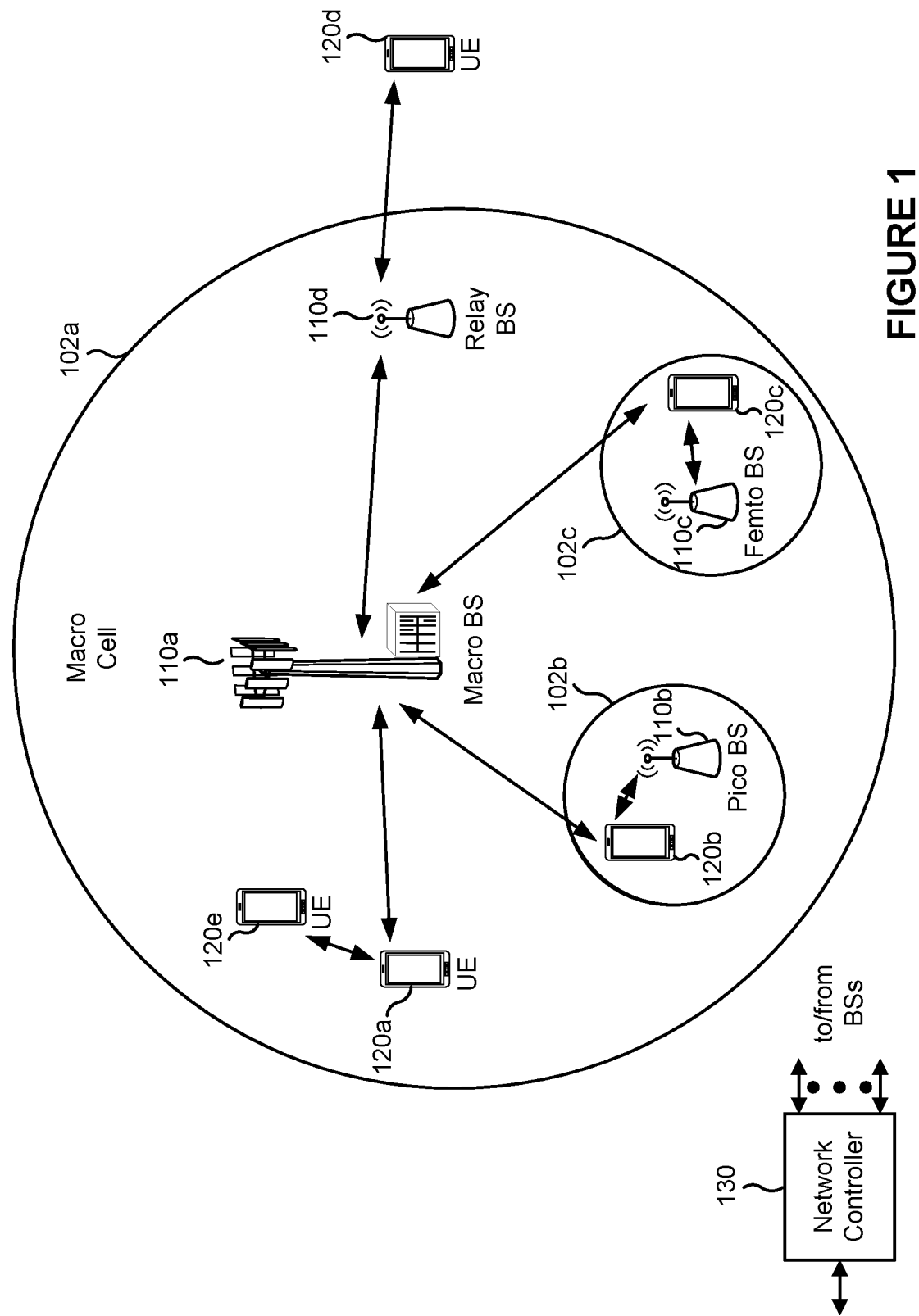
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

Support for multicast or broadcast (sometimes referred to herein as multicast/broadcast) services is being added to New Radio (NR). In NR, a user equipment (UE) may be capable of receiving, for example, multicast/broadcast services in a mixed mode or a broadcast mode. Using mixed mode, multicast/broadcast services may be delivered using either a multicast/broadcast radio bearer (MRB) or a dedicated radio bearer (DRB) for a UE in a radio resource control (RRC) connected state. Using broadcast mode, multicast/broadcast services may be delivered using an MRB for a UE in an RRC connected state, an RRC idle state, or an RRC inactive state. However, the delivery of multicast/broadcast services in the RRC idle state or the RRC inactive state may increase UE power consumption for these states that were, on the contrary, designed to reduce UE power consumption.

Various aspects generally relate to maintaining an MRB in an RRC idle state or an RRC inactive state. Some aspects more specifically relate to maintaining the MRB while the UE is in the RRC idle state or the RRC inactive state subject to one or more limitations associated with maintaining the MRB in the RRC idle state or the RRC inactive state. In some aspects, the procedures for receiving multicast/broadcast traffic in the RRC idle state or the RRC inactive state may differ from corresponding procedures in the RRC connected state due to different operating characteristics associated with these states. Thus, in some aspects, the one or more limitations apply to the MRB while the UE is in the RRC idle state or the RRC inactive state, and do not apply to the MRB while the UE is in an RRC connected state. In some aspects, the one or more limitations relate to permitted signaling in the idle/inactive state or the use of one or more timers by the UE in the idle/inactive state, among other examples.

Particular aspects of the subject matter described in this disclosure can be implemented to realize one or more of the following potential advantages. In some examples, the described techniques can be used to enable a UE to reliably receive multicast/broadcast traffic while in an RRC idle state or an RRC inactive state. Furthermore, the described techniques can be used to conserve power or other UE resources in the RRC idle state or the RRC inactive state (e.g., as compared to the RRC connected state) while enabling reliable reception of multicast/broadcast traffic.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), or a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Figure 2:
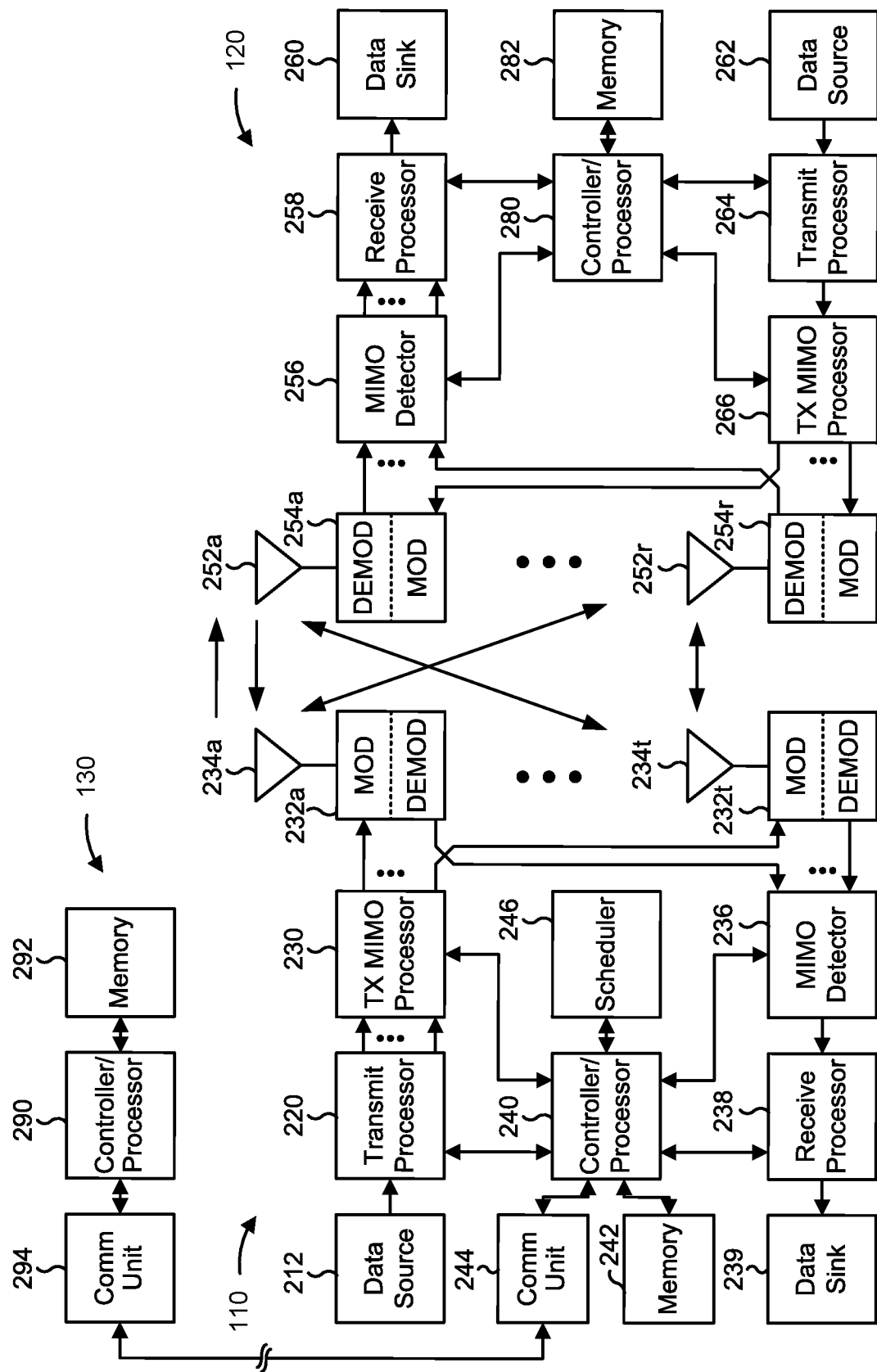
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254*a* through 254*r* (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with maintaining a multicast/broadcast radio bearer in an idle state or an inactive state, as described in more detail elsewhere herein. For example, controller/processor 240 of base station 110, controller/processor 280 of UE 120, or any other component(s) of FIG. 2 may perform or direct operations of, for example, process 600 of FIG. 6, process 800 of FIG. 8, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving a configuration for an MRB in an RLC acknowledged mode; means for entering an idle state or an inactive state after the MRB has been configured; means for maintaining the MRB while the UE 120 is in the idle state or the inactive state subject to one or more limitations associated with maintaining the MRB in the idle state or the inactive state; among other examples. In some aspects, UE 120 includes means for exiting the idle state or the inactive state to enter a connected state. In some aspects, UE 120 includes means for communicating using the MRB while in the connected state using the configuration. In some aspects, UE 120 includes means for receiving one or more retransmissions via the MRB while in the idle state or the inactive state. In some aspects, UE 120 includes means for receiving a polling request, for triggering transmission of an RLC status report, while the UE 120 is in the idle state or the inactive state. In some aspects, UE 120 includes means for refraining from transmitting the RLC status report in response to the polling request based at least in part on the UE 120 being in the idle state or the inactive state and based at least in part on the one or more limitations.

In some aspects, UE 120 includes means for receiving a configuration for an MRB in an RLC acknowledged mode; means for storing a context associated with the MRB in a memory of the UE 120 based at least in part on the configuration; means for entering an idle state or an inactive state, after the MRB has been configured and the context has been stored, without removing the context from the memory; means for maintaining the MRB while the UE 120 is in the idle state or the inactive state subject to one or more limitations associated with maintaining the MRB in the idle state or the inactive state based at least in part on entering the idle state or the inactive state without removing the context from the memory; or a combination thereof.

In some aspects, the means for the UE 120 to perform operations or processes described herein may include one or more components of UE 120 described in connection with FIG. 2, such as antenna 252, demodulator 254, MIMO detector 256, receive processor 258, transmit processor 264, TX MIMO processor 266, modulator 254, controller/processor 280, and/or memory 282.

Figure 3:
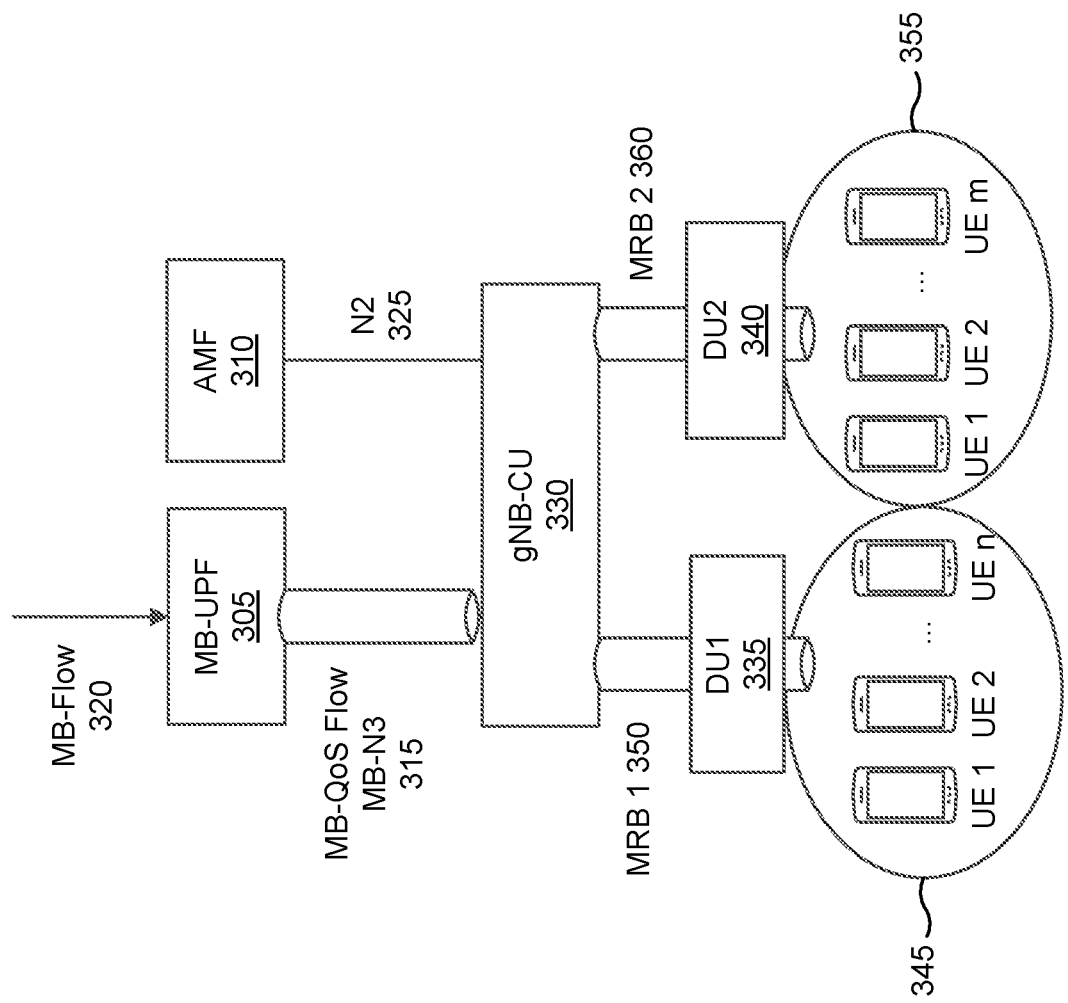
FIG. 3 is a block diagram illustrating a logical architecture of a distributed radio access network (RAN) in accordance with various aspects of the present disclosure.

FIG. 3 is a block diagram illustrating a logical architecture of a distributed radio access network (RAN) in accordance with various aspects of the present disclosure. One or more entities of a 5G network may have a multicast/broadcast (MB) user plane function (MB-UPF) 305 and an access and mobility function (AMF) 310. The MB-UPF 305 may have an N3 interface 315 for delivering an MB-flow 320 of packets (for example, in the form of protocol data units (PDUs)) to a 5G access node, such as a gNB. The AMF 310 may control signaling for MB-flow setup and modification using an N2 interface 325 with the gNB.

The gNB may include a central unit (CU), shown as gNB-CU 330. The gNB may also include one or more distributed units (DUs), shown as DU1 335 and DU2 340. The DU1 335 and the DU2 340 may be configured to individually (for example, via dynamic selection) or jointly (for example, via joint transmission) serve traffic to a UE. As shown, DU1 335 may serve traffic to a first UE or a first group of UEs 345 using a first multicast/broadcast radio bearer (MRB), shown as MRB1 350, and DU2 340 may serve traffic to a second UE or a second group of UEs 355 using a second MRB, shown as MRB2 360.

Support for multicast or broadcast (sometimes referred to herein as multicast/broadcast) services is being added to NR. In NR, a UE may be capable of receiving, for example, multicast/broadcast services in a mixed mode or a broadcast mode. Using mixed mode, multicast/broadcast services may be delivered using either an MRB (a multicast/broadcast bearer) or a dedicated radio bearer (DRB) for a UE in an RRC connected state. Using broadcast mode, multicast/broadcast services may be delivered using an MRB for a UE in an RRC connected state, an RRC idle state, or an RRC inactive state. Some techniques and apparatuses described herein enable a UE to reliably receive multicast/broadcast traffic while in an RRC idle state or an RRC inactive state. As described in more detail below, the procedures for receiving multicast/broadcast traffic in the RRC idle state or the RRC inactive state may differ from corresponding procedures in the RRC connected state due to different operating characteristics of these states.

Figure 4:
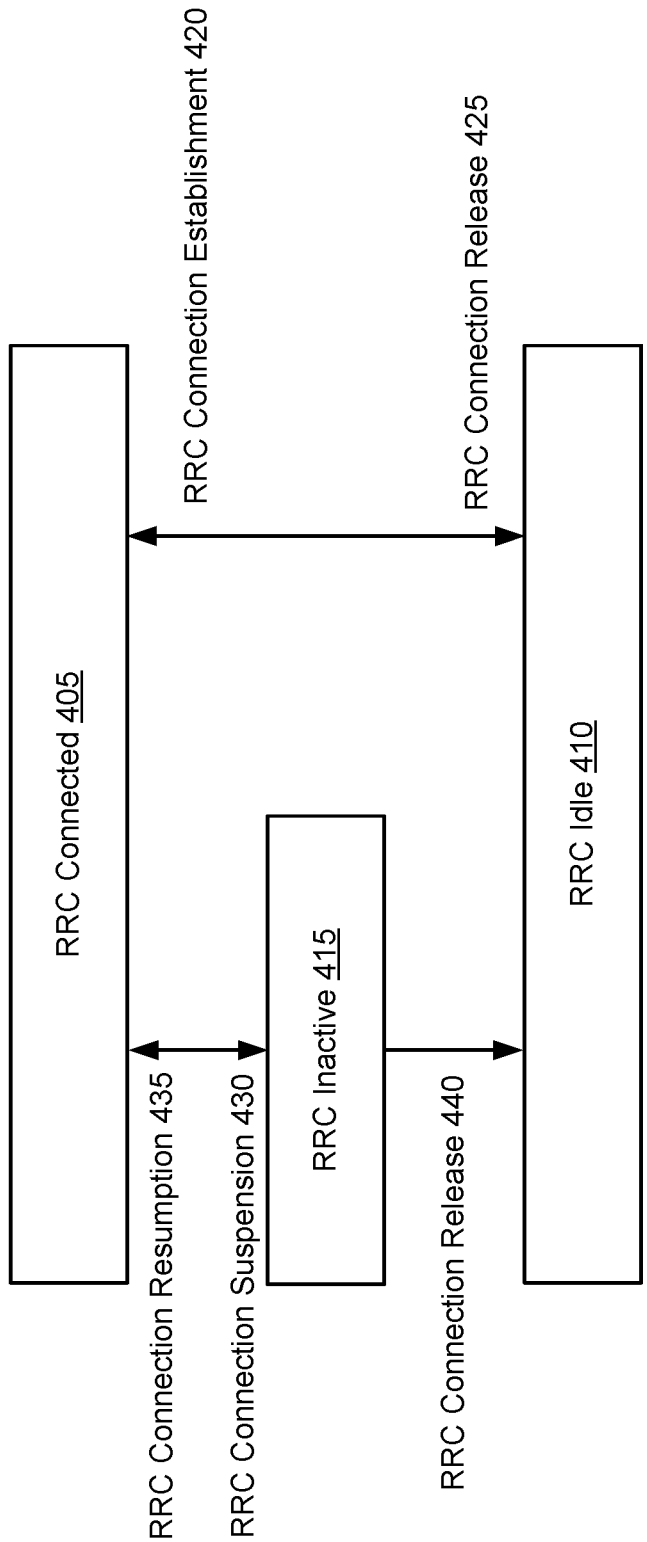
FIG. 4 is a state machine diagram illustrating states of a radio resource control procedure and transitions between the states in accordance with various aspects of the present disclosure.

FIG. 4 is a state machine diagram illustrating states of a radio resource control (RRC) procedure and transitions between the states in accordance with various aspects of the present disclosure. As shown, a UE may transition among an RRC connected state 405, an RRC idle state 410, and an RRC inactive state 415. An RRC procedure may be used, for example, for connection establishment, re-establishment, or release between a UE and a base station, for on-demand transfer of system information, for suspension or resumption of an RRC connection, for signaling relating to handover, or for radio link handling, among other examples.

Upon powering on, a UE may enter the RRC idle state 410. The UE may transition from the RRC idle state 410 to the RRC connected state 405 via RRC connection establishment 420 (sometimes referred to as attaching to the network). The UE may transition from the RRC connected state 405 to the RRC idle state 410 via RRC connection release 425 (sometimes referred to as detaching from the network) or due to a connection failure. Alternatively, the UE may transition from the RRC connected state 405 to the RRC inactive state 415 via RRC connection suspension 430 (also referred to as RRC suspend or RRC release with suspend). In the RRC inactive state, the UE maintains the RRC connection while reducing signaling and power consumption. In the RRC inactive state 415, the UE may transition to the RRC connected state 405 via RRC connection resumption 435 (also referred to as RRC resume), or may transition to the RRC idle state 410 via RRC connection release 440 or due to a connection failure. In the RRC connected state 405 and the RRC inactive state 415, the UE is registered with and connected to the core network. In the RRC idle state 410, the UE is de-registered from the core network.

In the RRC connected state 405, a core network to RAN connection may be established for the UE for both the user plane and the control plane, the UE may be capable of communicating using the RAN connection (for example, a base station connection) and the core network, the UE and the RAN may store an access stratum context for the UE, the RAN may store information indicating the cell that is serving the UE, unicast data may be transferred between the RAN and the UE, the network may control mobility of the UE (including, for example, UE measurements), and the UE may be capable of operating in a connected mode discontinuous reception (CDRX) mode for power saving.

In the RRC idle state 410, the UE may be capable of selecting a public land mobile network (PLMN), receiving system information messages, having mobility for cell re-selection, receiving pages initiated and managed by the core network, and operating in a discontinuous reception (DRX) mode for power saving.

In the RRC inactive state 415, the UE may be capable of receiving system information messages, having mobility for cell re-selection, receiving pages initiated and managed by the RAN, and operating in a DRX mode for power saving. Furthermore, an RRC connection between the UE and the RAN (and the RAN and the core network) remains established for the UE, the UE continues to store an access stratum context for the UE, and the RAN may continue to store information indicating the cell that is serving the UE. Because both the UE and the base station store an access stratum context for the UE in the RRC inactive state 415, transitioning from the RRC inactive state 415 to the RRC connected state 405 does not require non-access stratum (NAS) signaling, which extends UE battery life and reduces latency in transitioning to the RRC connected state 405 as compared to transitioning from the RRC idle state 410 to the RRC connected state 405. In some aspects, the UE may transition from the RRC connected state 405 to the RRC inactive state 415 due to lack of activity (for example, based at least in part on a timer).

Some techniques and apparatuses described herein enable a UE to reliably receive multicast/broadcast traffic while in an RRC idle state or an RRC inactive state. As described in more detail below, the procedures for receiving multicast/broadcast traffic in the RRC idle state or the RRC inactive state may differ from corresponding procedures in the RRC connected state due to different operating characteristics associated with these states.

Figure 5:
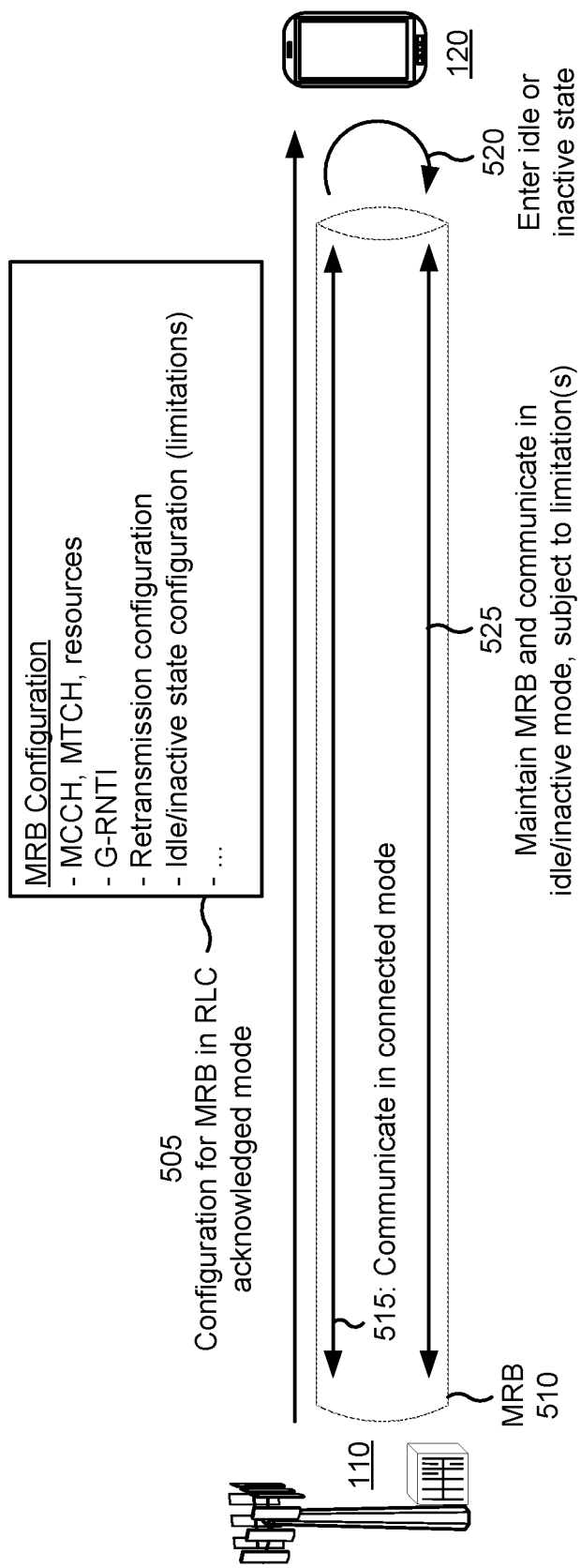
FIG. 5 is a diagram illustrating an example of maintaining a multicast/broadcast radio bearer in an idle state or an inactive state in accordance with various aspects of the present disclosure.

FIG. 5 is a diagram illustrating an example of maintaining a multicast/broadcast radio bearer in an idle state or an inactive state in accordance with various aspects of the present disclosure. As shown in FIG. 5, a UE 120 and a base station 110 may communicate with one another.

In a first operation 505, the base station 110 may transmit, to the UE 120, a configuration for an MRB 510 in a radio link control (RLC) acknowledged mode (AM). In RLC AM, reliable transmission of multicast/broadcast traffic may be supported using acknowledgment (ACK) or negative acknowledgement (NACK) feedback and retransmissions. In some aspects, the ACK or NACK (sometimes referred to as ACK/NACK) feedback may be transmitted by the UE 120 in an RLC status report. In some aspects, the base station 110 may transmit the configuration in a configuration message, such as an RRC message (for example, an RRC configuration message or an RRC reconfiguration message, among other examples). The base station 110 and the UE 120 may establish an MRB 510 based at least in part on the MRB configuration.

As shown, the MRB configuration may indicate a multicast/broadcast control channel (MCCH) for transmission of multicast/broadcast control messages. Additionally or alternatively, the MRB configuration may indicate a multicast/broadcast traffic channel (MTCH) for transmission of multicast/broadcast data. For example, the MRB configuration may indicate resources (such as time domain resources, frequency domain resources, or spatial domain resources, among other examples) allocated to the MCCH and the MTCH. Additionally or alternatively, the MRB configuration may indicate a group radio network temporary identifier (G-RNTI) associated with the MRB 510. The G-RNTI may be used to transmit (such as by scrambling) communications on the MRB 510 and to receive (such as by descrambling) communications on the MRB 510. In some aspects, different multicast/broadcast subscriptions may be associated with different G-RNTIs.

Additionally or alternatively, the MRB configuration may indicate a retransmission configuration for multicast/broadcast traffic transmitted via the MRB 510. For example, the MRB configuration may indicate whether retransmissions are unicast retransmissions (which may use a cell radio network temporary identifier (C-RNTI) in a similar manner as a G-RNTI), multicast/broadcast retransmissions (which may use a G-RNTI, as described above), or capable of being switched between unicast and multicast/broadcast. In some aspects, the retransmission configuration may indicate one or more resources to be used for retransmissions (for example, for preconfigured retransmissions).

Additionally or alternatively, the MRB configuration may indicate an idle/inactive state configuration for the MRB 510. The term idle/inactive state may be used herein to refer to the idle state (such as an RRC idle state 410), the inactive state (such as an RRC inactive state 415), or both. In some aspects, the MRB configuration may indicate whether the MRB 510 is permitted to be maintained during the idle/inactive state (for example, to enable or disable multicast/broadcast communication via the MRB 510 in the idle/inactive state, or by continuing to store a context in memory rather than deleting the context upon exiting the RRC connected state and entering the idle/inactive state). Additionally or alternatively, the MRB configuration may indicate one or more limitations associated with the MRB 510 for the idle/inactive state. In some aspects, the one or more limitations apply to the MRB 510 while the UE 120 is in the idle state or the inactive state, and do not apply to the MRB 510 while the UE 120 is in a connected state (such as an RRC connected state). The one or more limitations may relate to, for example, permitted signaling in the idle/inactive state (such as signaling of an RLC status report or a response to a polling request, among other examples) or the use of one or more timers by the UE 120 in the idle/inactive state, among other examples. In some aspects, a limitation may disable, for the idle/inactive state, signaling that is used in the connected state. Additionally or alternatively, a limitation may disable a timer, that is used in the connected state, for the idle/inactive state.

Although the one or more limitations are described above and shown in FIG. 5 as being indicated in the MRB configuration, in some aspects, one or more limitations may not be signaled in the MRB configuration. For example, one or more limitations may be autonomously applied by the UE 120 in the idle/inactive state without receiving an indication of those one or more limitations.

In a second operation 515, the base station 110 and the UE 120 may communicate in a connected mode, such as the RRC connected mode 405 described above in connection with FIG. 4. For example, the base station 110 may transmit multicast/broadcast control information to the UE 120 via the MRB 510 (such as on the MCCH). The base station 110 may transmit multicast/broadcast data to the UE 120 via the MRB 510 (such as on the MTCH). When the connection between the UE 120 and the base station 110 is established (such as by an RRC connection establishment procedure), the UE 120 may transition from an RRC idle state 410 to an RRC connected state 405.

To communicate in the RRC connected state 405 for multicast/broadcast services, a connection may be established between the base station 110 and a core network for both the user plane (such as via an N3 interface with an MB-UPF 305) and the control plane (such as via an N2 interface with an AMF 310). Additionally or alternatively, the UE 120 and the base station 110 may store an access stratum (AS) context for the UE 120, the base station 110 may store information indicating the cell that is serving the UE 120, multicast/broadcast data may be transferred between the base station 110 and the UE 120, the AMF 310 may control mobility of the UE 120, and the UE 120 may obtain and report measurements, among other examples.

In a third operation 520, the UE 120 may transition from the connected state to an idle state or an inactive state after the MRB 510 has been configured, such as by exiting the connected state and entering one of the idle state or the inactive state. For example, the UE 120 may transition from an RRC connected state 405 to an RRC idle state 410 via RRC connection release 425 (sometimes referred to as detaching from the network). Alternatively, the UE may transition from the RRC connected state 405 to the RRC inactive state 415 via RRC connection suspension 430 (also referred to as RRC suspend or RRC release with suspend).

In a fourth operation 525, the UE 120 and the base station 110 may maintain the MRB 510 while the UE 120 is in the idle state or the inactive state. For example, the UE 120 and the base station 110 may maintain the MRB 510 by storing or continuing to store a context (e.g., an AS context or an MRB context) in memory rather than deleting the context upon exiting the connected state and entering the idle/inactive state. The context may indicate, for example, a bearer identifier that identifies the MRB, quality of service information associated with the MRB, information indicated in the MRB configuration, or a combination thereof. In some aspects, the base station 110 may maintain the MRB 510 by maintaining (e.g., storing in memory) the MRB configuration for the MRB 510, which may indicate an MCCH, an MTCH, resources allocated to the MCCH or the MTCH, a G-RNTI associated with the MRB 510, a retransmission configuration for the MRB 510, an idle/inactive state configuration for the MRB 510, the one or more limitations associated with maintaining the MRB 510 in the idle/inactive state, or a combination thereof, as described above. By maintaining the MRB 510, the base station 110 may be capable of transmitting multicast/broadcast communications to the UE 120 while the UE 120 is in the idle state or the inactive state, which conserves UE resources (such as memory resources, processing resources, or battery power, among other examples) while enabling reliable multicast/broadcast communications. However, to conserve UE resources, the MRB 510 may be maintained subject to one or more limitations.

As described above, the one or more limitations apply to the MRB 510 while the UE 120 is in the idle state or the inactive state, and do not apply to the MRB 510 while the UE 120 is in the connected state. The one or more limitations may relate to, for example, permitted signaling in the idle/inactive state (such as signaling of an RLC status report or a response to a polling request, among other examples) or the use of one or more timers by the UE 120 in the idle/inactive state, among other examples. In some aspects, a limitation may disable, for the idle/inactive state, signaling that is used in the connected state. In such examples, the UE 120 may apply the limitation while the UE 120 is in the idle/inactive state by refraining from transmitting one or more signals or messages that are prohibited by the limitation. Additionally or alternatively, a limitation may disable a timer, that is used in the connected state, for the idle/inactive state. In such examples, the UE 120 may apply the limitation while the UE 120 is in the idle/inactive state by refraining from using a timer that is prohibited by the limitation.

For example, a limitation may prohibit the UE 120 from transmitting an RLC status report while the UE 120 is in the idle state or the inactive state. An RLC status report may be used to indicate an ACK or a NACK to a communication received via the MRB 510. By disabling ACK/NACK reporting for the UE 120, the UE 120 may conserve UE resources in the idle state or the inactive state. However, the UE 120 may still be capable of receiving retransmissions via the MRB 510 due to RLC status reports transmitted by other UEs 120. In some aspects, the UE 120 may monitor for retransmissions on the MRB 510 while in the idle/inactive state based at least in part on a retransmission configuration, as described above. Additionally or alternatively, the UE 120 may monitor for multicast/broadcast control information (such as on the MCCH) while in the idle/inactive state (such as on preconfigured resources) to identify resources via which the retransmissions are to be transmitted.

The base station 110 may use RLC status reports to determine multicast/broadcast data transmissions to be retransmitted. When RLC status reports are disabled for UEs 120 in the idle/inactive state, the base station 110 bases retransmission decisions for a multicast/broadcast subscription on a subset of UEs 120 that are subscribed to receive the multicast/broadcast subscription (for example, only the UEs 120 that are in a connected state, and not the UEs 120 that are in the idle state or the inactive state). Thus, in some aspects, the base station 110 may use a different parameter (for example, a different threshold) to determine whether to retransmit an RLC packet (a multicast/broadcast communication) when an MRB 510 is permitted to be maintained in the idle/inactive state, as compared to when the MRB 510 is not permitted to be maintained in the idle/inactive state. Additionally or alternatively, the base station 110 may modify a retransmission factor (e.g., by increasing a retransmission factor, by increasing a quantity of retransmissions, by decreasing a retransmission factor, or by decreasing a quantity of retransmissions, among other examples) when an MRB 510 is permitted to be maintained in the idle/inactive state, as compared to when the MRB 510 is not permitted to be maintained in the idle/inactive state. In some aspects, the base station 110 may determine the parameter or the retransmission factor based at least in part on a quantity of UEs 120 in an idle mode, a quantity of UEs 120 in an inactive mode, one or more measurements received from UEs 120 in a connected mode, one or more measurements received from UEs 120 prior to those UEs 120 transitioning to the idle mode or the inactive mode (for example, a last measurement before transitioning), or a combination thereof.

As another example, a limitation may cause the UE 120 to ignore a polling request, for triggering transmission of an RLC status report, while the UE 120 is in the idle state or the inactive state. The base station 110 may transmit the polling request to trigger UEs 120, that receive the polling request, to transmit an RLC status report. A polling request may include, for example, a polling bit transmitted in a downlink acknowledged mode data (AMD) PDU. In some aspects, if the UE 120 is prohibited from reporting an RLC status report in the idle/inactive state, and the UE 120 receives a polling request (such as a polling bit) that would trigger transmission of an RLC status report if the UE 120 were in the connected state, then the UE 120 may ignore the polling request if the UE 120 is in the idle/inactive state. By ignoring the polling request, the UE 120 refrains from transmitting an RLC status report in response to the polling request.

As another example, a limitation may cause the UE 120 to disable or refrain from using a status prohibit timer. A status prohibit timer may be associated with preventing transmission of multiple RLC status reports within a time period defined by the status prohibit timer. For example, while in the connected state, the UE 120 may transmit an RLC status report (such as in response to a first polling request), and may then start the status prohibit timer. If the UE 120 receives a second polling request before the status prohibit timer expires, then the UE 120 may refrain from transmitting an RLC status report in response to the second polling request. However, in the idle/inactive state, RLC status reporting may be disabled. As a result, the UE 120 can conserve UE resources by disabling the status prohibit timer because the UE 120 will not transmit any RLC status reports while in the idle/inactive mode.

As another example, a limitation may cause the UE 120 to disable or refrain from using a reassembly timer. The reassembly timer may be associated with discarding an incomplete RLC packet responsive to all segments of the RLC packet not being received within a time period defined by the reassembly timer. For example, while in the connected state, the UE 120 may receive a segment of an RLC packet, and may then start a reassembly timer associated with the RLC packet. If the UE 120 does not receive all segments of the RLC packet before the reassembly timer expires, then the UE 120 may discard the RLC packet and may transmit a NACK for the RLC packet. However, in the idle/inactive state, RLC status reporting (including ACK/NACK reporting) may be disabled. As a result, the UE 120 can conserve UE resources by disabling the status reassembly timer because the UE 120 will not transmit a NACK due to discarding the RLC packet.

In some aspects, the UE 120 may exit the idle/inactive state and enter the connected state. In such examples, the UE 120 may use the maintained MRB 510 to communicate in the connected state. However, the UE 120 may not be subject to the one or more limitations while in the connected state.

By maintaining the MRB 510 in the idle/inactive state, the UE 120 can receive multicast/broadcast traffic while in the idle/inactive state, thereby reducing latency, improving reliability, and reducing signaling overhead (such as signaling overhead used to establish the MRB 510). Furthermore, by maintaining the MRB 510 in the idle/inactive state subject to one or more limitations described herein, the UE 120 can conserve resources (such as memory resources, processing resources, or battery power, among other examples) in the idle/inactive state. Furthermore, the UE 120 can use the maintained MRB 510 when transitioning from the idle/inactive state to the connected state, which reduces latency and conserves signaling overhead associated with establishing the MRB 510.

Figure 6:
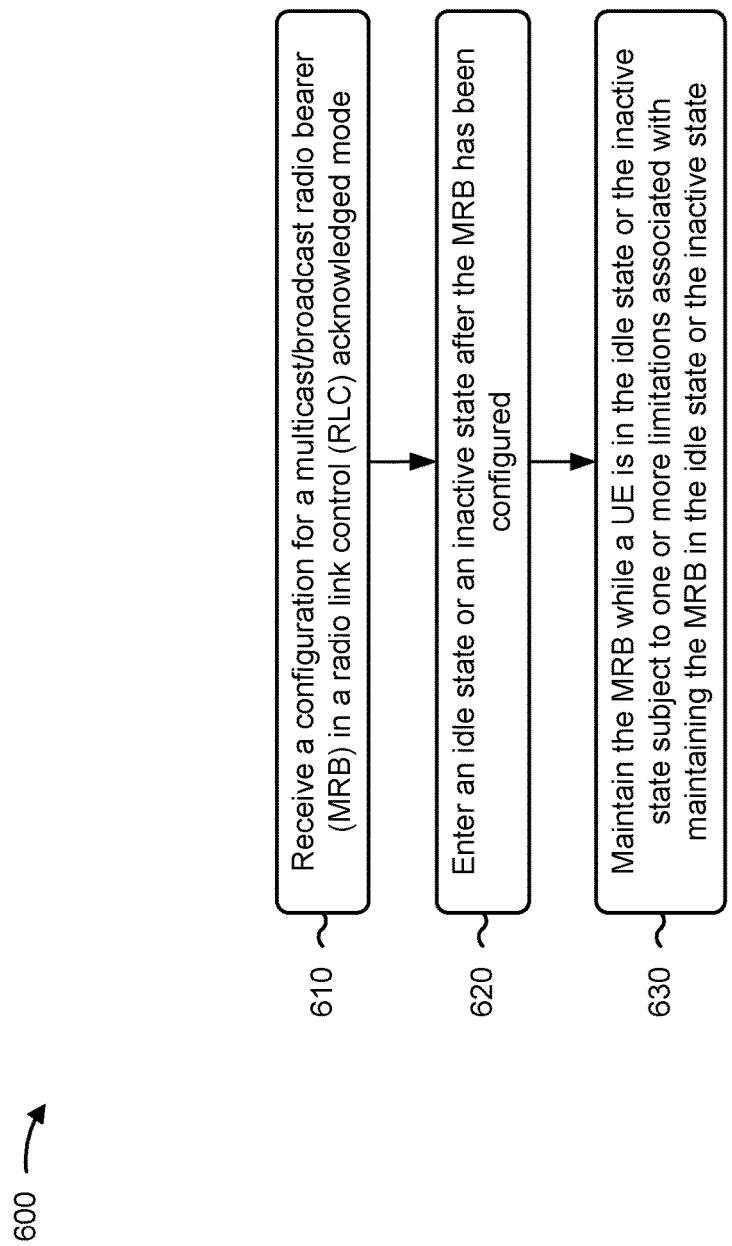
FIG. 6 is a flowchart illustrating an example process performed by a UE in accordance with various aspects of the present disclosure.

FIG. 6 is a flowchart illustrating an example process 600 performed, for example, by a UE in accordance with various aspects of the present disclosure. The example process is an example where a UE (for example, UE 120) performs operations relating to maintaining an MRB in an idle state or an inactive state.

As shown in FIG. 6, in some aspects, process 600 may include receiving a configuration for an MRB in an RLC acknowledged mode (block 610). For example, the UE (for example, using receive processor 258, controller/processor 280, or memory 282, among other examples) may receive a configuration for an MRB in an RLC acknowledged mode, as described above.

As further shown in FIG. 6, in some aspects, process 600 may include entering an idle state or an inactive state after the MRB has been configured (block 620). For example, the UE (for example, using receive processor 258, transmit processor 264, controller/processor 280, or memory 282, among other examples) may enter an idle state or an inactive state after the MRB has been configured, as described above.

As further shown in FIG. 6, in some aspects, process 600 may include maintaining the MRB while the UE is in the idle state or the inactive state, subject to one or more limitations associated with maintaining the MRB in the idle state or the inactive state (block 630). For example, the UE (for example, using receive processor 258, transmit processor 264, controller/processor 280, or memory 282, among other examples) may maintain the MRB while the UE is in the idle state or the inactive state subject to one or more limitations associated with maintaining the MRB in the idle state or the inactive state, as described above.

The process 600 may include additional aspects, such as any single aspect or any combination of aspects described below or in connection with one or more other processes described elsewhere herein.

In a first aspect, the one or more limitations apply to the MRB while the UE is in the idle state or the inactive state and do not apply to the MRB while the UE is in a connected state.

In a second aspect, alone or in combination with the first aspect, process 600 includes exiting the idle state or the inactive state to enter a connected state, and communicating using the MRB while in the connected state using the configuration.

In a third aspect, alone or in combination with one or more of the first and second aspects, process 600 includes receiving one or more retransmissions via the MRB while in the idle state or the inactive state.

In a fourth aspect, alone or in combination with one or more of the first through third aspects, the one or more limitations prohibit the UE from transmitting an RLC status report while the UE is in the idle state or the inactive state.

In a fifth aspect, alone or in combination with one or more of the first through fourth aspects, the one or more limitations cause the UE to ignore a polling request, for triggering transmission of an RLC status report, while the UE is in the idle state or the inactive state.

In a sixth aspect, alone or in combination with one or more of the first through fifth aspects, process 600 includes receiving a polling request, for triggering transmission of an RLC status report, while the UE is in the idle state or the inactive state; and refraining from transmitting the RLC status report in response to the polling request based at least in part on the UE being in the idle state or the inactive state and based at least in part on the one or more limitations.

In a seventh aspect, alone or in combination with one or more of the first through sixth aspects, the one or more limitations cause the UE to refrain from using one or more timers while the UE is in the idle state or the inactive state.

In an eighth aspect, alone or in combination with one or more of the first through seventh aspects, the one or more timers include a status prohibit timer associated with preventing transmission of multiple RLC status reports within a time period defined by the status prohibit timer.

In a ninth aspect, alone or in combination with one or more of the first through eighth aspects, the one or more timers include a reassembly timer associated with discarding an incomplete RLC packet responsive to all segments of the RLC packet not being received within a time period defined by the reassembly timer.

In a tenth aspect, alone or in combination with one or more of the first through ninth aspects, maintaining the MRB includes storing a context associated with the MRB in memory of the UE rather than deleting the context from memory upon entering the idle state or the inactive state.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
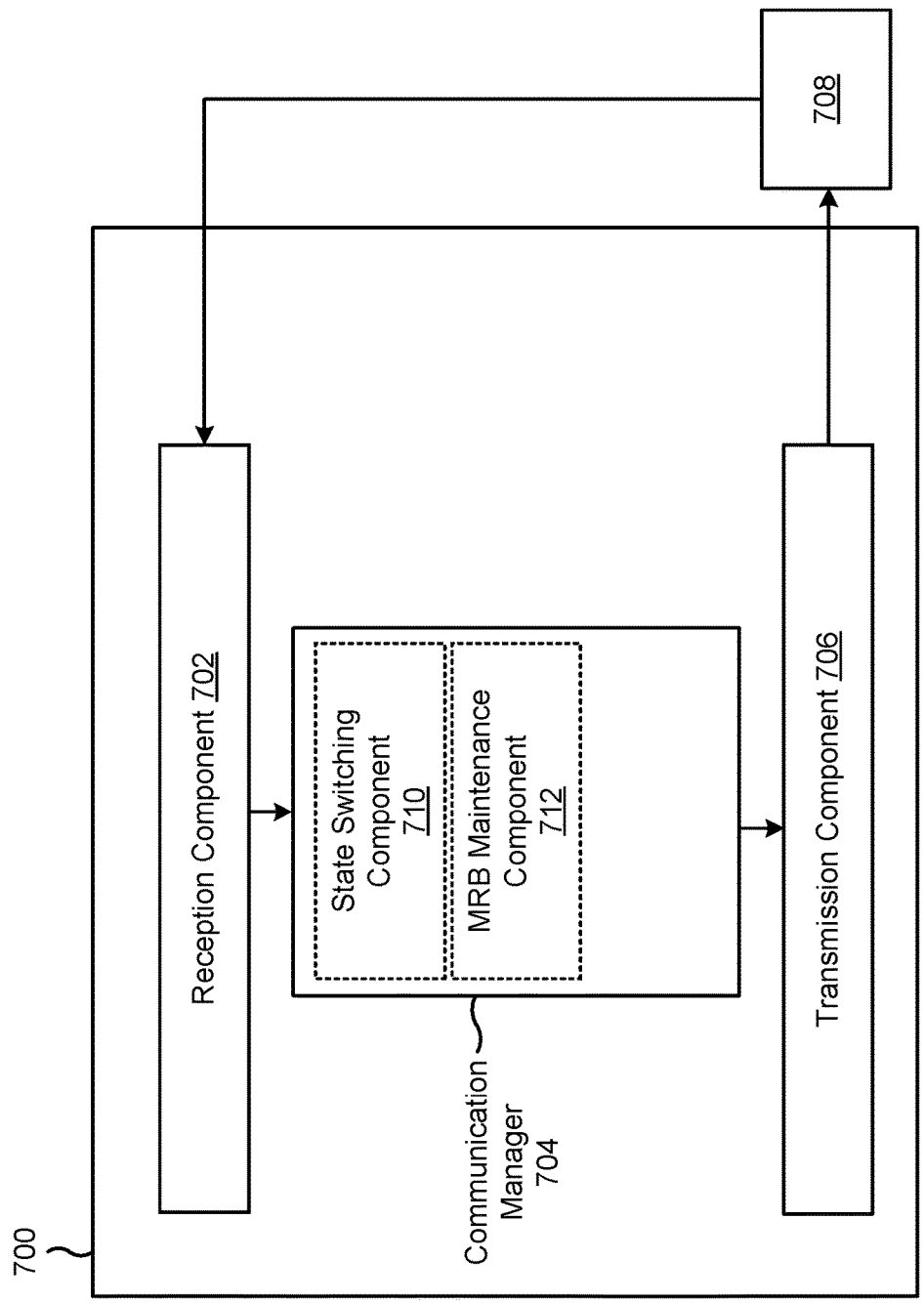
FIG. 7 is a block diagram of an example apparatus for wireless communication in accordance with various aspects of the present disclosure.

FIG. 7 is a block diagram of an example apparatus 700 for wireless communication in accordance with various aspects of the present disclosure. The apparatus 700 may be a UE, or a UE may include the apparatus 700. In some aspects, the apparatus 700 includes a reception component 702, a communication manager 704, and a transmission component 706, which may be in communication with one another (for example, via one or more buses). As shown, the apparatus 700 may communicate with another apparatus 708 (such as a UE, a base station, or another wireless communication device) using the reception component 702 and the transmission component 706.

In some aspects, the apparatus 700 may be configured to perform one or more operations described herein in connection with FIG. 5. Additionally or alternatively, the apparatus 700 may be configured to perform one or more processes described herein, such as process 600 of FIG. 6, process 800 of FIG. 8, or a combination thereof. In some aspects, the apparatus 700 may include one or more components of the UE described above in connection with FIG. 2.

The reception component 702 may receive communications, such as reference signals, control information, data communications, or a combination thereof, from the apparatus 708. The reception component 702 may provide received communications to one or more other components of the apparatus 700, such as the communication manager 704. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the UE described above in connection with FIG. 2.

The transmission component 706 may transmit communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include one or more antennas, a modulator, a transmit MIMO processor, a transmit processor, a controller/processor, a memory, or a combination thereof, of the UE described above in connection with FIG. 2. In some aspects, the transmission component 706 may be co-located with the reception component 702 in a transceiver.

The communication manager 704 may receive or may cause the reception component 702 to receive a configuration for an MRB in an RLC acknowledged mode. The communication manager 704 may enter an idle state or an inactive state after the MRB has been configured. The communication manager 704 may maintain the MRB while the apparatus 700 is in the idle state or the inactive state subject to one or more limitations associated with maintaining the MRB in the idle state or the inactive state. The communication manager 704 may exit the idle state or the inactive state to enter a connected state. The communication manager 704 may communicate using the MRB while in the connected state using the configuration. The communication manager 704 may receive or may cause the reception component 702 to receive one or more retransmissions via the MRB while in the idle state or the inactive state. The communication manager 704 may receive or may cause the reception component 702 to receive a polling request, for triggering transmission of an RLC status report, while the apparatus 700 is in the idle state or the inactive state. The communication manager 704 refrain from transmitting or may cause the transmission component 706 to refrain from transmitting the RLC status report in response to the polling request based at least in part on the apparatus 700 being in the idle state or the inactive state and based at least in part on the one or more limitations. In some aspects, the communication manager 704 may include a controller/processor, a memory, or a combination thereof, of the UE described above in connection with FIG. 2.

In some aspects, the communication manager 704 may include a set of components, such as a state switching component 710, an MRB maintenance component 712, or a combination thereof. Alternatively, the set of components may be separate and distinct from the communication manager 704. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive a configuration for an MRB in an RLC acknowledged mode. The state switching component 710 may cause the apparatus 700 to enter an idle state or an inactive state after the MRB has been configured. The MRB maintenance component 712 may maintain the MRB while the apparatus 700 is in the idle state or the inactive state subject to one or more limitations associated with maintaining the MRB in the idle state or the inactive state. The state switching component 710 may cause the apparatus 700 to exit the idle state or the inactive state to enter a connected state. The reception component 702 and/or the transmission component 706 may communicate using the MRB while in the connected state using the configuration. The reception component 702 may receive one or more retransmissions via the MRB while in the idle state or the inactive state. The reception component 702 may receive a polling request, for triggering transmission of an RLC status report, while the apparatus 700 is in the idle state or the inactive state. The transmission component 706 to refrain from transmitting the RLC status report in response to the polling request based at least in part on the apparatus 700 being in the idle state or the inactive state and based at least in part on the one or more limitations.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
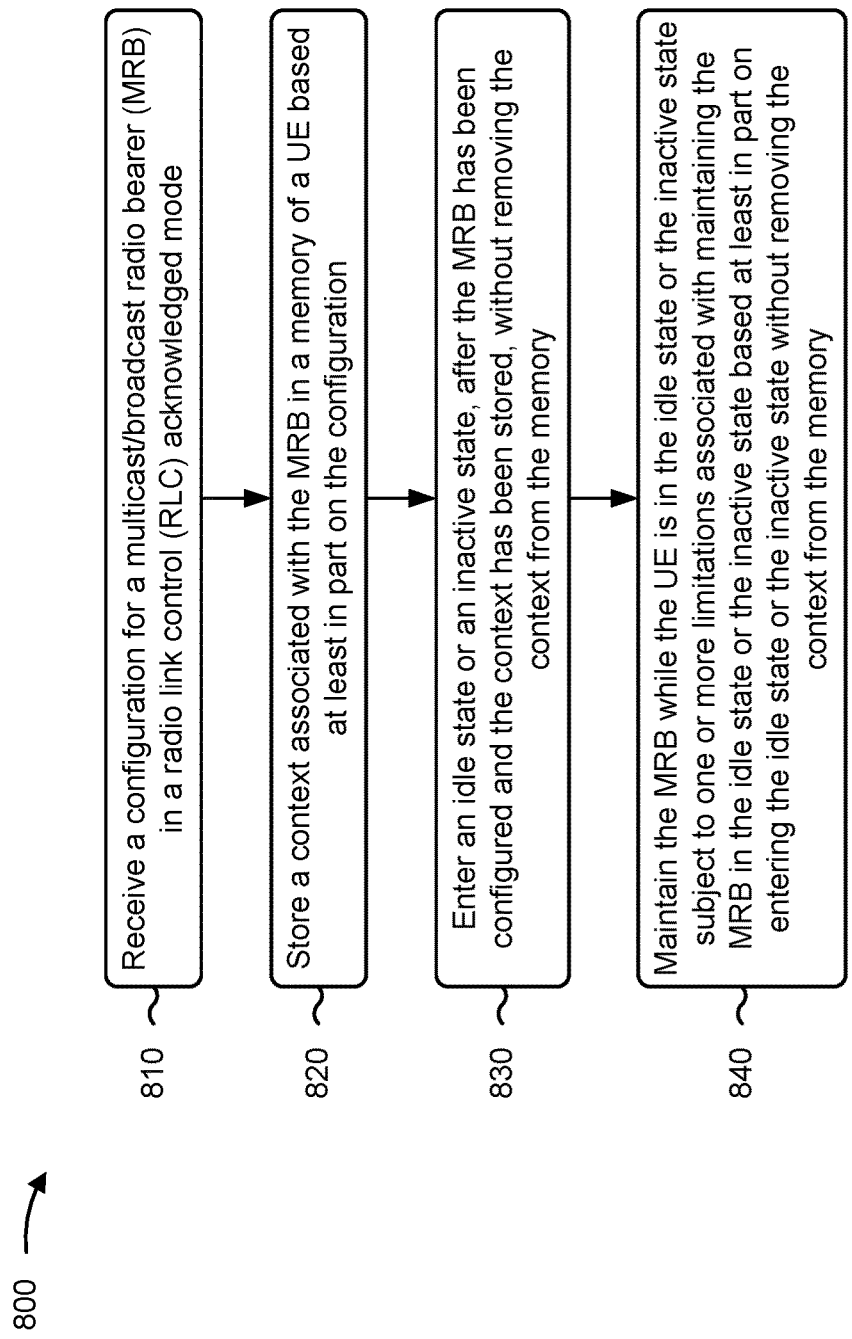
FIG. 8 is a flowchart illustrating an example process performed by a UE in accordance with various aspects of the present disclosure.

FIG. 8 is a flowchart illustrating an example process 800 performed, for example, by a UE in accordance with various aspects of the present disclosure. Example process 800 is an example where the UE (for example, UE 120) performs operations associated with maintaining a multicast/broadcast radio bearer in an idle state or an inactive state.

As shown in FIG. 8, in some aspects, process 800 may include receiving a configuration for an MRB in an RLC acknowledged mode (block 810). For example, the UE (such as by using reception component 902, depicted in FIG. 9) may receive a configuration for an MRB in an RLC acknowledged mode, as described above.

As further shown in FIG. 8, in some aspects, process 800 may include storing a context associated with the MRB in a memory of the UE based at least in part on the configuration (block 820). For example, the UE (such as by using context storage component 910, depicted in FIG. 9) may store a context associated with the MRB in a memory of the UE based at least in part on the configuration, as described above.

As further shown in FIG. 8, in some aspects, process 800 may include entering an idle state or an inactive state, after the MRB has been configured and the context has been stored, without removing the context from the memory (block 830). For example, the UE (such as by using state switching component 912, depicted in Figure XXXX) may enter an idle state or an inactive state, after the MRB has been configured and the context has been stored, without removing the context from the memory, as described above.

As further shown in FIG. 8, in some aspects, process 800 may include maintaining the MRB while the UE is in the idle state or the inactive state subject to one or more limitations associated with maintaining the MRB in the idle state or the inactive state based at least in part on entering the idle state or the inactive state without removing the context from the memory (block 840). For example, the UE (such as by using MRB maintenance component 914, depicted in FIG. 9) may maintain the MRB while the UE is in the idle state or the inactive state subject to one or more limitations associated with maintaining the MRB in the idle state or the inactive state based at least in part on entering the idle state or the inactive state without removing the context from the memory, as described above.

Process 800 may include additional aspects, such as any single aspect or any combination of aspects described below or in connection with one or more other processes described elsewhere herein.

In a first additional aspect, the one or more limitations apply to the MRB while the UE is in the idle state or the inactive state and do not apply to the MRB while the UE is in a connected state.

In a second additional aspect, alone or in combination with the first aspect, the one or more limitations prohibit the UE from transmitting an RLC status report while the UE is in the idle state or the inactive state.

In a third additional aspect, alone or in combination with one or more of the first and second aspects, the one or more limitations cause the UE to ignore a polling request, for triggering transmission of an RLC status report, while the UE is in the idle state or the inactive state.

In a fourth additional aspect, alone or in combination with one or more of the first through third aspects, the one or more limitations cause the UE to refrain from using one or more timers while the UE is in the idle state or the inactive state.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
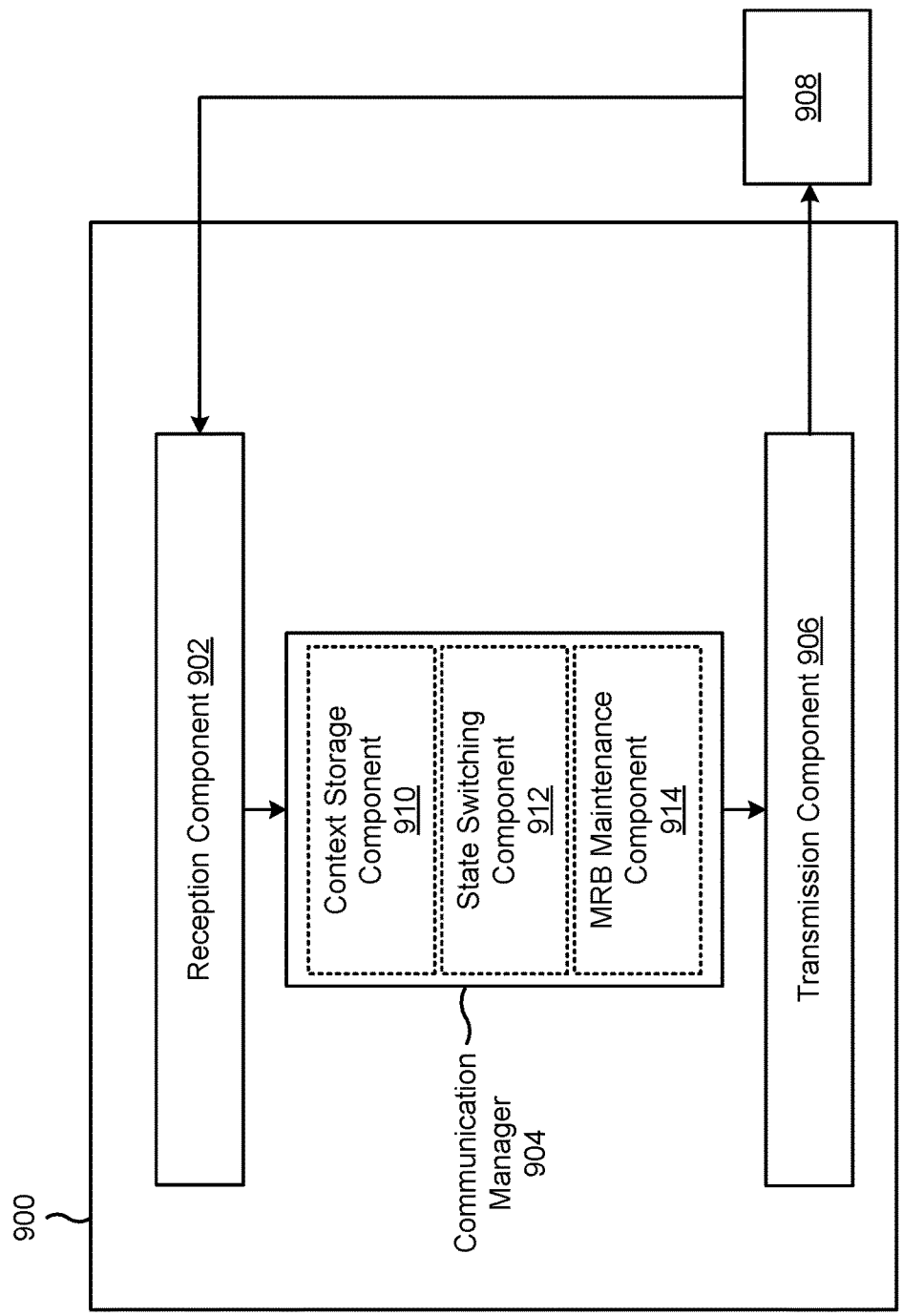
FIG. 9 is a block diagram of an example apparatus for wireless communication in accordance with various aspects of the present disclosure.

FIG. 9 is a block diagram of an example apparatus 900 for wireless communication in accordance with various aspects of the present disclosure. The apparatus 900 may be a UE, or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIG. 5. Additionally or alternatively, the apparatus 900 may be configured to perform one or more processes described herein, such as process 600 of FIG. 6, process 800 of FIG. 8, or a combination thereof. In some aspects, the apparatus 900 may include one or more components of the UE described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE described above in connection with FIG. 2. In some aspects, the transmission component 906 may be co-located with the reception component 902 in a transceiver.

The communication manager 904 may receive or may cause the reception component 902 to receive a configuration for an MRB in an RLC acknowledged mode. The communication manager 904 may store a context associated with the MRB in a memory of the UE based at least in part on the configuration. The communication manager 904 may cause the apparatus 900 to enter an idle state or an inactive state, after the MRB has been configured and the context has been stored, without removing the context from the memory. The communication manager 904 may maintain the MRB while the UE is in the idle state or the inactive state subject to one or more limitations associated with maintaining the MRB in the idle state or the inactive state based at least in part on entering the idle state or the inactive state without removing the context from the memory. In some aspects, the communication manager 904 may perform one or more operations described elsewhere herein as being performed by one or more components of the communication manager 904.

The communication manager 904 may include a controller/processor, a memory, or a combination thereof, of the UE described above in connection with FIG. 2. In some aspects, the communication manager 904 includes a set of components, such as a context storage component 910, a state switching component 912, an MRB maintenance component 914, or a combination thereof. Alternatively, the set of components may be separate and distinct from the communication manager 904. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive a configuration for an MRB in an RLC acknowledged mode. The context storage component 910 may store a context associated with the MRB in a memory of the UE based at least in part on the configuration. The state switching component 912, the context storage component 910, or a combination thereof may enter or may cause the apparatus 900 to enter an idle state or an inactive state, after the MRB has been configured and the context has been stored, without removing the context from the memory. The MRB maintenance component 914, the context storage component 910, or a combination thereof may maintain the MRB while the UE is in the idle state or the inactive state subject to one or more limitations associated with maintaining the MRB in the idle state or the inactive state based at least in part on entering the idle state or the inactive state without removing the context from the memory.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a configuration for a multicast/broadcast radio bearer (MRB);
   entering an idle state or an inactive state after the MRB has been configured; and
   maintaining the MRB while the UE is in the idle state or the inactive state subject to one or more limitations, of the configuration, associated with maintaining the MRB in the idle state or the inactive state, wherein the one or more limitations cause the UE to refrain from using one or more timers while the UE is in the idle state or the inactive state, and wherein the one or more timers include one or more of:
   a first timer associated with preventing transmission of multiple status reports within a time period defined by the first timer, or
   a second timer associated with discarding an incomplete packet responsive to all segments of the incomplete packet not being received within a time period defined by the second timer.

2. The method of claim 1, wherein maintaining the MRB includes storing a context associated with the MRB in memory of the UE rather than deleting the context from memory upon entering the idle state or the inactive state.

3. The method of claim 1, wherein the one or more limitations apply to the MRB while the UE is in the idle state or the inactive state and do not apply to the MRB while the UE is in a connected state.

4. The method of claim 1, further comprising:
   exiting the idle state or the inactive state to enter a connected state; and
   communicating using the MRB while in the connected state using the configuration.

5. The method of claim 1, further comprising receiving one or more retransmissions via the MRB while in the idle state or the inactive state.

6. The method of claim 1, wherein the one or more limitations prohibit the UE from transmitting a radio link control (RLC) status report while the UE is in the idle state or the inactive state.

7. The method of claim 1, wherein the one or more limitations further cause the UE to ignore a polling request, for triggering transmission of a radio link control (RLC) status report, while the UE is in the idle state or the inactive state.

8. The method of claim 1, further comprising:
   receiving a polling request, for triggering transmission of a radio link control (RLC) status report, while the UE is in the idle state or the inactive state; and
   refraining from transmitting the RLC status report in response to the polling request based at least in part on the UE being in the idle state or the inactive state and based at least in part on the one or more limitations.

9. The method of claim 1, wherein the one or more timers include the first timer.

10. The method of claim 1, wherein the one or more timers include the second timer.

11. A user equipment (UE) for wireless communication, comprising:
    a memory; and
    one or more processors configured to:
      receive a configuration for a multicast/broadcast radio bearer (MRB);
      enter an idle state or an inactive state after the MRB has been configured; and
      maintain the MRB while the UE is in the idle state or the inactive state subject to one or more limitations, of the configuration, associated with maintaining the MRB in the idle state or the inactive state, wherein the one or more limitations cause the UE to refrain from using one or more timers while the UE is in the idle state or the inactive state, and wherein the one or more timers include one or more of:
        a first timer associated with preventing transmission of multiple status reports within a time period defined by the first timer, or
        a second timer associated with discarding an incomplete packet responsive to all segments of the incomplete packet not being received within a time period defined by the second timer.

12. The UE of claim 11, wherein the one or more processors, when maintaining the MRB, are configured to store a context associated with the MRB in the memory rather than deleting the context from the memory upon entering the idle state or the inactive state.

13. The UE of claim 11, wherein the one or more limitations apply to the MRB while the UE is in the idle state or the inactive state and do not apply to the MRB while the UE is in a connected state.

14. The UE of claim 11, wherein the one or more processors are further configured to:
    exit the idle state or the inactive state to enter a connected state; and
    communicate using the MRB while in the connected state using the configuration.

15. The UE of claim 11, wherein the one or more processors are further configured to receive one or more retransmissions via the MRB while in the idle state or the inactive state.

16. The UE of claim 11, wherein the one or more limitations prohibit the UE from transmitting a radio link control (RLC) status report while the UE is in the idle state or the inactive state.

17. The UE of claim 11, wherein the one or more limitations further cause the UE to ignore a polling request, for triggering transmission of a radio link control (RLC) status report, while the UE is in the idle state or the inactive state.

18. The UE of claim 11, wherein the one or more processors are further configured to:
receive a polling request, for triggering transmission of a radio link control (RLC) status report, while the UE is in the idle state or the inactive state; and
refrain from transmitting the RLC status report in response to the polling request based at least in part on the UE being in the idle state or the inactive state and based at least in part on the one or more limitations.

19. The UE of claim 11, wherein the one or more timers include the first timer.

20. The UE of claim 11, wherein the one or more timers include the second timer.

21. A method of wireless communication performed by a user equipment (UE), comprising:
receiving a configuration for a multicast/broadcast radio bearer (MRB);
storing a context associated with the MRB in a memory of the UE based at least in part on the configuration;
entering an idle state or an inactive state, after the MRB has been configured and the context has been stored, without removing the context from the memory; and
maintaining the MRB while the UE is in the idle state or the inactive state subject to one or more limitations, of the configuration, associated with maintaining the MRB in the idle state or the inactive state based at least in part on entering the idle state or the inactive state without removing the context from the memory, wherein the one or more limitations cause the UE to refrain from using one or more timers while the UE is in the idle state or the inactive state, and wherein the one or more timers include one or more of:
a first timer associated with preventing transmission of multiple status reports within a time period defined by the first timer, or
a second timer associated with discarding an incomplete packet responsive to all segments of the incomplete packet not being received within a time period defined by the second timer.

22. The method of claim 21, wherein the one or more limitations apply to the MRB while the UE is in the idle state or the inactive state and do not apply to the MRB while the UE is in a connected state.

23. The method of claim 21, wherein the one or more limitations prohibit the UE from transmitting a radio link control (RLC) status report while the UE is in the idle state or the inactive state.

24. The method of claim 21, wherein the one or more limitations further cause the UE to ignore a polling request, for triggering transmission of a radio link control (RLC) status report, while the UE is in the idle state or the inactive state.

25. A user equipment (UE) for wireless communication, comprising:
a memory; and
one or more processors configured to:
receive a configuration for a multicast/broadcast radio bearer (MRB);
store a context associated with the MRB in the memory based at least in part on the configuration;
enter an idle state or an inactive state, after the MRB has been configured and the context has been stored, without removing the context from the memory; and
maintain the MRB while the UE is in the idle state or the inactive state subject to one or more limitations, of the configuration, associated with maintaining the MRB in the idle state or the inactive state based at least in part on entering the idle state or the inactive state without removing the context from the memory, wherein the one or more limitations cause the UE to refrain from using one or more timers while the UE is in the idle state or the inactive state, and wherein the one or more timers include one or more of:
a first timer associated with preventing transmission of multiple status reports within a time period defined by the first timer, or
a second timer associated with discarding an incomplete packet responsive to all segments of the incomplete packet not being received within a time period defined by the second timer.

26. The UE of claim 25, wherein the one or more limitations apply to the MRB while the UE is in the idle state or the inactive state and do not apply to the MRB while the UE is in a connected state.

27. The UE of claim 25, wherein the one or more limitations prohibit the UE from transmitting an RLC status report while the UE is in the idle state or the inactive state.

28. The UE of claim 25, wherein the one or more limitations further cause the UE to ignore a polling request for triggering transmission of a radio link control (RLC) status report while the UE is in the idle state or the inactive state.

29. The UE of claim 25, wherein the one or more timers include the first timer.

30. The UE of claim 25, wherein the one or more timers include the second timer.

* * * * *